United States Patent
Choi et al.

[19]

[11] Patent Number: 5,949,229
[45] Date of Patent: Sep. 7, 1999

[54] POWER FACTOR CORRECTION CIRCUIT HAVING AN ERROR SIGNAL MULTIPLIED BY A CURRENT SIGNAL

[75] Inventors: Nak-Choon Choi; Maeng-Ho Seo, both of Puncheon, Rep. of Korea

[73] Assignee: Samsung Electronics, Co., Ltd., Suwon, Japan

[21] Appl. No.: 08/919,528

[22] Filed: Aug. 28, 1997

[30] Foreign Application Priority Data

Aug. 28, 1996 [KR] Rep. of Korea ..................... 96-36171

[51] Int. Cl.⁶ ..................................................... G05F 1/613
[52] U.S. Cl. ........................ 323/320; 323/222; 323/285; 323/288
[58] Field of Search ................................. 323/210, 222, 323/282, 285, 288

[56] References Cited

U.S. PATENT DOCUMENTS

| | | | |
|---|---|---|---|
| 4,536,700 | 8/1985 | Bello et al. | 323/285 |
| 4,942,509 | 7/1990 | Shires et al. | 323/222 |
| 4,987,361 | 1/1991 | Ohms | 323/222 |
| 5,003,454 | 3/1991 | Bruning | 363/81 |
| 5,397,976 | 3/1995 | Madden et al. | 323/282 |
| 5,430,364 | 7/1995 | Gibson | 323/222 |
| 5,436,550 | 7/1995 | Arakawa | 323/222 |
| 5,565,762 | 10/1996 | Ishikawa et al. | 323/282 |
| 5,612,609 | 3/1997 | Choi | 323/285 |
| 5,757,635 | 5/1998 | Seong | 323/222 |
| 5,764,039 | 6/1998 | Choi et al. | 323/285 |

*Primary Examiner*—Jeffrey Sterrett
*Attorney, Agent, or Firm*—Marger Johnson & McCollom, P.C.

[57] ABSTRACT

A power factor correction circuit for a boost converter includes a current feedforward loop that senses the input voltage by detecting variations in the rate of change of current in an inductor, thereby eliminating the need for a voltage feedforward loop. A current sense circuit generates a current signal responsive to the input current flowing through the inductor when a switching transistor is turned on. A comparator compares the current signal to a sawtooth signal, thereby generating a control signal for turning the transistor off. The output of the converter is controlled by a voltage feedback loop which includes an error amplifier that generates an error signal responsive to the output voltage. The error signal is then multiplied by the current signal before the current signal is compared to the sawtooth signal.

16 Claims, 3 Drawing Sheets

POWER FACTOR CORRECTION CIRCUIT HAVING AN ERROR SIGNAL MULTIPLIED BY A CURRENT SIGNAL

This application corresponds to Korean patent application No. 96-36171 filed Aug. 28, 1996 in the name of Samsung Electronics Co., Ltd. which is herein incorporated by reference for all purposes.

The subject matter of this application is related to that disclosed in co-pending U.S. patent application Ser. No. 08/748,208, now U.S. Pat. No. 5,764,039, which is commonly assigned with the present application and which is herein incorporated by reference.

BACKGROUND OF THE INVENTION

1. Field of the Invention

This invention relates generally to voltage converters and more particularly to a circuit for correcting the power factor of a boost-type voltage converter.

2. Description of the Related Art

Simple capacitor rectification circuits have generally been used to obtain DC power from alternating current ("AC") power sources. However, in such rectification circuits, the input current flows exclusively in pulses at the peak portion of the input AC voltage, thereby degrading the power factor. Also, because a combination of resistive (R), inductive (L) and capacitive (C) components appear in various electric devices, the current and voltage from the power source are out of phase with respect to each other and the voltage is subjected to distortion.

If high-speed switching methods are employed to control electric appliances, it causes noise in the distribution system. Such noise results in interference between electric devices connected to the same power line. In order to decrease the effect exerted on the power supply voltage by the current flowing through the electrical appliance itself, the electrical appliance may be designed to maintain a high input power factor.

It is well known that a continuous current mode (CCM) control type power factor correction circuit is suitable for use in high power factor applications. Conventional CCM control type power factor circuits can be classified into three types: peak-current detection type, variable hysteresis type, and mean current control type. All of these circuits, however, have disadvantages when used for obtaining a high power factor.

Peak-current detection type power factor circuits tend to produce distortion which prevents accurate power compensation. Variable hysteresis type power factor circuits tend to present difficulties in controlling frequency during low voltage applications. The circuitry required for implementing a mean current control type system tends to be very complicated.

Also, in conventional power factor correction circuits, a voltage feedforward circuit is employed for sensing the input voltage so as to allow the power factor circuit to maintain the input current in phase with the input voltage. However, voltage feedforward circuits add complication to the power factor correction circuit.

Accordingly, a need remains for an improved technique for controlling the power factor in a switching power supply.

SUMMARY OF THE INVENTION

Therefore, it is an object of the present invention to provide a simplified circuit for controlling the power factor of a switching power converter.

To accomplish these and other objects, a power factor correction circuit constructed in accordance with the present invention includes a current feedforward loop that senses the input voltage by detecting variations in the rate of change of current in an inductor, thereby eliminating the need for a voltage feedforward loop. A current sense circuit generates a current signal responsive to the input current flowing through the inductor when a switching transistor is turned on. A comparator compares the current signal to a sawtooth signal, thereby generating a control signal for turning the transistor off. The output of the converter is controlled by a voltage feedback loop which includes an error amplifier that generates an error signal responsive to the output voltage. The error signal is then multiplied by the current signal before the current signal is compared to the sawtooth signal.

One aspect of the present invention is a power factor correction circuit for a switching power converter having an inductor and a switch for controlling the inductor, the circuit comprising: a signal generator for generating a sawtooth signal; a current sensing circuit coupled to the converter to generate a current signal responsive to current flowing through the inductor; and a comparing circuit coupled to the signal generator, the current sensing circuit, and the switch; wherein the comparing circuit compares the sawtooth signal to the current signal, thereby generating a control signal for controlling the switch.

The circuit can also include an error amplifying circuit coupled to the converter for generating an error signal responsive to the output voltage of the converter; and a multiplier circuit coupled to the current sensing circuit, the error amplifying circuit, and the comparing circuit for multiplying the current signal and the error signal. The current sensing circuit can be coupled in series with the switch and arranged to sense the current through the inductor only when the switch is closed, it can be arranged to sense the current through the inductor when the switch is open and closed.

Another aspect of the present invention is a power factor correction circuit for a switching power converter having an inductor and a switch for controlling the inductor in switching cycles, the circuit comprising: a signal generator for generating a cyclical sloping signal; a current sensing circuit coupled to the converter for generating a current signal responsive to current flowing through the inductor; and a comparing circuit coupled to the signal generator, the current sensing circuit, and the switch, wherein the comparing circuit compares the cyclical sloping signal to the current signal, thereby generating a control signal for controlling the switch; wherein each cycle of the sloping signal corresponds to a switching cycle.

A further aspect of the present invention is a method for controlling a switching power converter having an inductor and a switch for controlling the inductor in switching cycles, the method comprising: turning the switch on during each switching cycle; sensing current flowing through the inductor; comparing the current flowing through the inductor to a sawtooth signal; and turning the switch off during each switching cycle responsive to the level of the sensed current.

An advantage of the present invention is that it provides power factor correction in a switching power converter without requiring a voltage feedforward loop.

The foregoing and other objects, features and advantages of the invention will become more readily apparent from the following detailed description of a preferred embodiment of the invention which proceeds with reference to the accompanying drawings.

DETAILED DESCRIPTION

Figure 1:
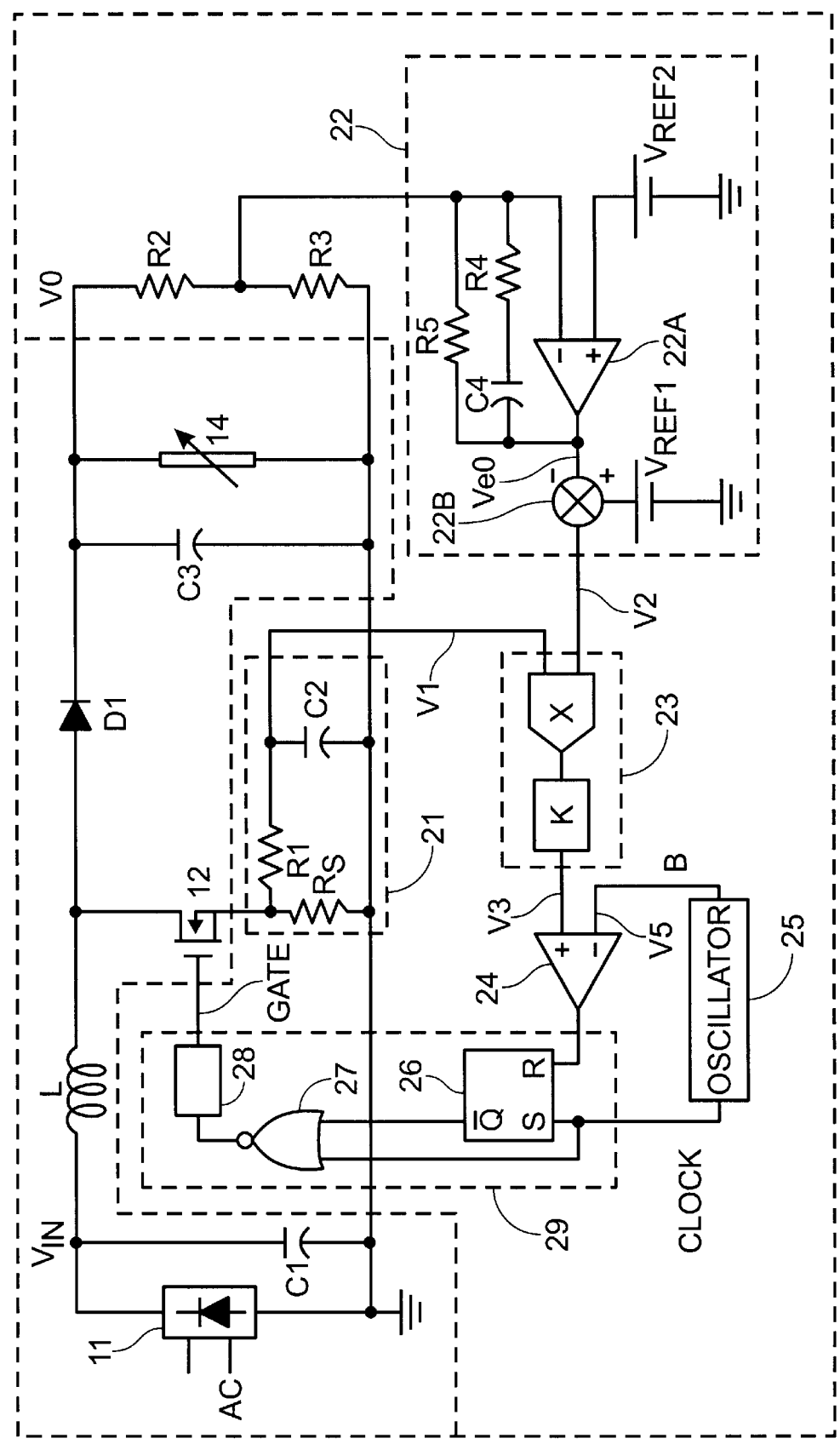
FIG. 1 is a schematic diagram of an embodiment of a boost power converter having a power factor correction circuit in accordance with the present invention.

FIG. 1 is a schematic diagram of an embodiment of a power supply circuit having a high power factor correction circuit in accordance with the present invention. Prior to describing the detailed structure of the power supply circuit, the key components of the system will be identified followed by a brief description of the operation of the system. Then a more detailed description of each of the components will be provided along with a more detailed description of the operation.

Referring to FIG. 1, the power supply circuit includes a boost converter 10 and a high power factor correction circuit 20. The boost converter 10 includes a first rectifier 11 for rectifying an input AC power supply AC, a capacitor C1, an inductor L for inducing a voltage in accordance with an input current, a switching transistor 12 for controlling the switching operation of the inductor L, a diode D1 for rectifying the output voltage of the inductor L to provide a rectified voltage to a load 14, and a bulk capacitor C3.

The high power factor correction circuit 20 includes an error amplifying section 22 for sensing the secondary output voltage Vo of the boost converter 10, a current sensing section 21 for sensing the input current flowing through the inductor L when the switching transistor 12 is switched on, a multiplier 23 for multiplying the input current detection voltage V1 (also referred to as the current signal) from the current sensing section 21 by the output voltage V2 (also referred to as the error signal) from the error amplifying section 22, a comparator 24 for comparing the output voltage V3 from the multiplier 23 with an inverse sawtooth wave B, an oscillator 25 for providing a reference clock signal CLOCK and the inverse sawtooth wave B which have the same frequency, and a gate drive section 29 for generating a gate signal for the switching transistor 12. The gate signal is set by the reference clock signal CLOCK and reset by an output of the comparator 24.

Figure 2:
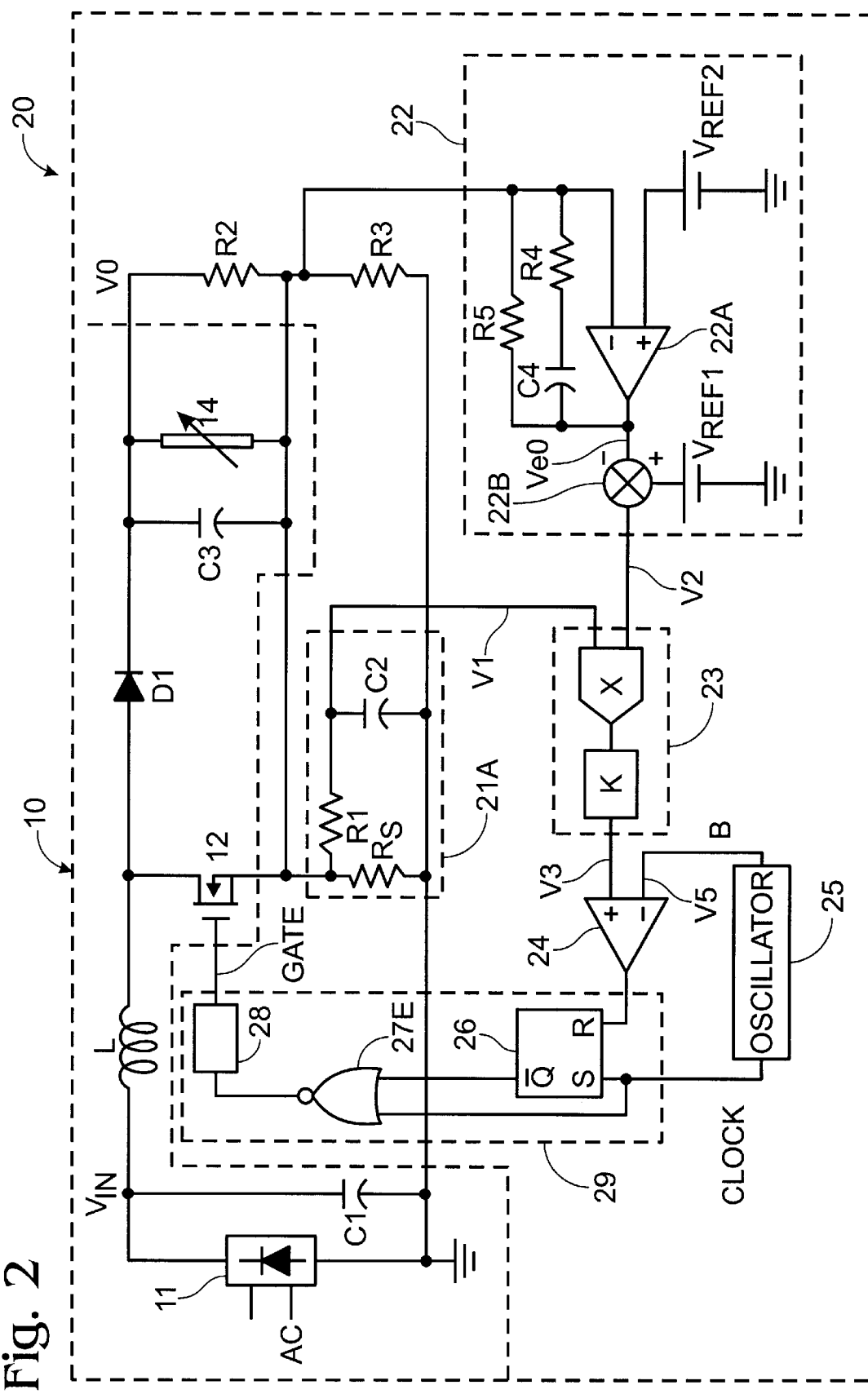
FIG. 2 is a schematic diagram of another embodiment of a boost power converter having a power factor correction circuit in accordance with the present invention.

In operation, the circuits of FIGS. 1 and 2 maintain the input current in phase and magnitude with the input voltage by sensing the input current through the inductor and comparing the sensed input current with the inverse sawtooth wave B to control the duty cycle of the switch. The current detection signal V1 from the current sensing section 21 or 21A includes an amount of current variation (di). A characteristic of the current detection signal is that its slope decreases as the input voltage Vin increases. Thus, information about the input voltage, which allows the circuits of FIGS. 1 and 2 to control the power factor, is fed forward through a current feedforward loop without requiring a voltage feedforward loop. Thus, the circuitry required for power factor correction is simplified.

The circuits of FIGS. 1 and 2 regulate the output voltage through a feedback loop which includes error amplifying circuit 22. Error amplifying circuit 22 senses the output voltage and generates an error signal V2 indicative of the output voltage. The current signal V1 (which is fed forward) is multiplied by the error signal V2 in multiplier 23 before being compared with the inverse sawtooth wave B to control the duty cycle and the output voltage.

More detailed consideration will now be given to the structure of the power supply circuit shown in FIG. 1.

The gate drive circuit 29 includes a flip-flop 26 which receives an output signal from the comparator 24 as its reset signal R and the reference clock signal CLOCK, which is synchronized with the inverse sawtooth wave B, as its set signal S. The gate drive circuit also includes a NOR gate 27 for NORing the inverting output/Q of the flip-flop 26 and the reference clock signal CLOCK, and an output drive section 28 for driving the switching transistor 12 in response to the output of the NOR gate 27.

The error amplifying section 22 includes an error amplifier 22A which receives a second reference voltage Vref2 as its non-inverting input. The output voltage Vo of the load 14 is divided by resistors R2 and R3 and supplied to the error amplifier 22A as its inverting input. The error amplifying section 22 amplifies the difference between the two input signals Vref2 and Vo with a predetermined amplification factor at the error amplifier 22A and generates an output voltage Ve0. A summer 22B receives the output voltage Ve0 at an inverting input terminal and sums it with a first reference voltage Vref1 which it receives at a noninverting input terminal.

The current sensing section 21 includes a current sensing resistor Rs which is connected in series between the source of switching transistor 12 and a power supply ground terminal. The sensing resistor detects the current flowing through the inductor L when the switching transistor 12 is switched on to produce the input current detection voltage V1, also referred to as a current signal. The current sensing section 21 further includes an RC filter comprising R1 and C2 coupled to the switching transistor 12 in series.

FIG. 2 is a block diagram of another embodiment of a power supplying circuit having a high power factor correction circuit in accordance with the present invention. The construction of the second embodiment is generally the same as that of the first embodiment explained hereinbefore with respect to FIG. 1, except that, in the second embodiment, the load 14 is coupled in between the cathode of diode D1 and the source of the switching transistor 12. Thus, while in the first embodiment the current sensing section 21 senses the input current only when the switching transistor 12 is switched on, in the second embodiment, the current sensing section 21A senses the input current not only when the switching transistor 12 is switched on but also when the switching transistor 12 is switched off, thereby making it easy to obtain the average value of the current flowing through the inductor L.

More detailed consideration will now be given to the operation of the circuits of FIGS. 1 and 2. In the error amplifying section 22, if the secondary output voltage Vo (which contains ripple components) increases, the voltage applied to the inverting terminal (−) of the error amplifier 22A also increases, thus causing the output voltage Veo of the error amplifier 22A to decrease. Accordingly, the output voltage V2 from the error amplifying section 22 through the summer 22B increases.

If the output voltage Vo decreases, the voltage applied to the inverting terminal (−) of the error amplifier 22A decreases, and the output voltage Veo from the error amplifier 22A increases. Thus, the output voltage V2 from the error amplifying section 22 through the summer 22B decreases. At this time, the output voltage V2 of the error amplifying section 22 always has a positive (+) value. The first reference voltage Vref1 is provided to the summer 22B so that the error amplifying section 22 provides the comparator 24 with a voltage ΔVo which is proportional to the change of the output voltage Vo of the boost converter 10.

When the switching transistor 12 is on, the input current flowing through the inductor L is sensed by the current sensing resistor Rs, and converted to the input current detection voltage signal V1 which is filtered through the RC filter R1 and C2 to remove noise contained therein.

The signal applied to the non-inverting input terminal (+) of the comparator 24 is the output voltage V3 from the multiplier 23 which multiplies the input current detection voltage V1 from the current sensing section 21 or 21A by the output voltage V2 from the error amplifying section 22. The output voltage V3 can be expressed by the following equation:

$$V3=K*V1*V2$$

where K represents a gain of the multiplier 23. The output voltage V3 of the multiplier 23 is then applied to the non-inverting input terminal (+) of the comparator 24.

The oscillator 25 applies the inverse sawtooth wave B to an inverting input terminal (−) of the comparator 24, and the reference clock signal CLOCK to the output driving section 28 via the NOR gate 27 to synchronize the operation of the output driving section 28 therewith. The output signal of the comparator 24, which is obtained by comparing the output V3 of the multiplier 23 with the inverse sawtooth wave B, is input to the flip-flop 26 as its reset signal R to switch off the switching transistor 12. The oscillator 25 also generates the reference clock signal CLOCK which is synchronized with the inverse sawtooth wave B and output to the flip-flop 26 as its set signal S to switch on the switching transistor 12.

Figure 3:
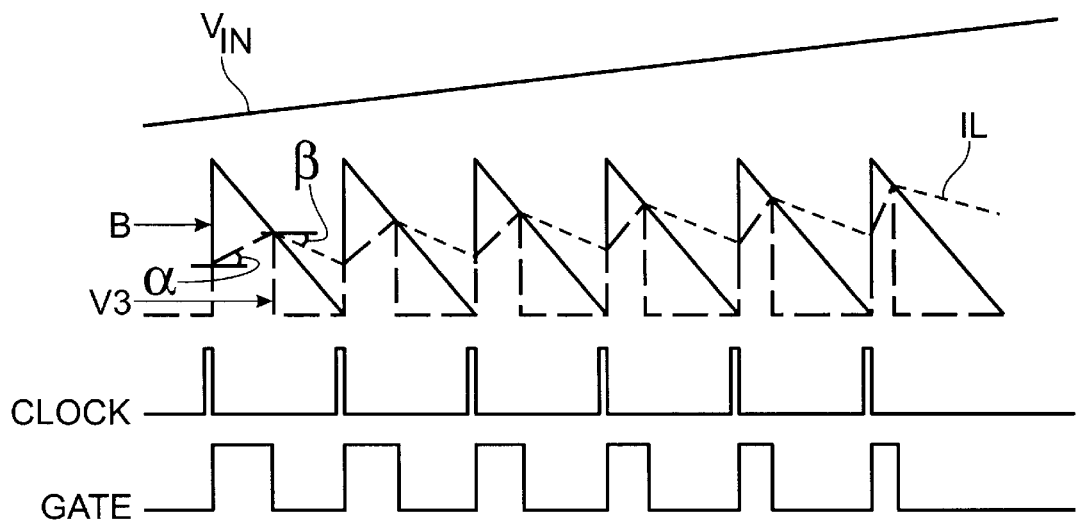
FIG. 3. is a waveform diagram illustrating the operation of a feedforward loop in accordance with the present invention.

More detailed consideration will now be given to the manner in which a power supply constructed in accordance with the present invention provides power factor correction. FIG. 3 is a waveform diagram that illustrates the operation of the current feedforward loop of the present invention. In FIG. 3, Vin denotes the voltage waveform applied to the inductor L. B denotes the inverse sawtooth waveform generated by the oscillator 25, and V3 denotes the output voltage waveform of the multiplier 23. CLOCK denotes the reference clock signal generated from the oscillator 25, and GATE denotes the voltage waveform applied to the gate of the switching transistor 12.

As shown in FIG. 3, when the switching transistor 12 is switched on, the energy accumulated in the inductor L is given by:

Vin=$V_L$

Vin=L*di(on)/dt(on)

Assuming that the value of the inductor L is constant, the input voltage Vin is proportional to the slope of the current, which is expressed as:

Vin di/dt

From the above expression, an ascending wave of the current having an angle of α as shown in FIG. 3 can be obtained.

Also, as another important factor, a descending slope of the current is given by:

Vin+VL=Vo

VL=Vo−Vin di(off)/dt(off) (Vo−Vin)/L

Here, the output voltage Vo of the boost converter 10 is assumed to be constant.

The descending slope of the current decreases as the input voltage Vin increases. This control as described above is shown in FIG. 3 as a descending current wave having an angle of β. Thus, a power factor correction circuit constructed in accordance with the present invention senses the input voltage by detecting changes in the slope of the input current through the inductor, thereby allowing it to control the power factor without requiring a voltage feedforward loop.

Figure 4:
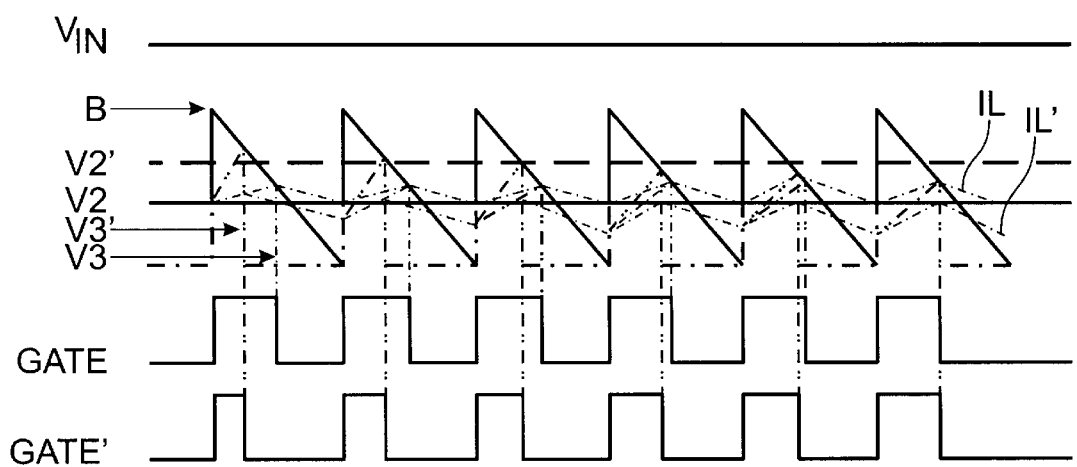
FIG. 4. is a waveform diagram illustrating the operation of a feedback loop in accordance with the present invention.

More detailed consideration will now be given to the manner in which a power supply constructed in accordance with the present invention regulates the output voltage. FIG. 4 is a waveform diagram that illustrates the operation of the voltage feedback loop of the present invention. In FIG. 4, Vin denotes the voltage waveform applied to the inductor L, and B denotes the inverse sawtooth waveform generated by the oscillator 25. V2 denotes the output voltage waveform of the error amplifying section 22, and V2' denotes the output voltage waveform of the error amplifying section 22 on the assumption that the output voltage of the boost converter 10 is increased. V3 denotes the output voltage waveform of the multiplier 23, and V3' denotes the output voltage waveform of the multiplier 23 on the assumption that the output voltage of the boost converter 10 is increased. CLOCK denotes the reference clock signal generated from the oscillator 25. GATE denotes the voltage waveform applied to the gate of the switching transistor 12, and GATE' denotes the voltage waveform applied to the gate of the switching transistor 12 on the assumption that the output voltage of the boost converter 10 is increased.

Referring to FIG. 4, as the output voltage Vo of the boost converter 10 increases, the output voltage Veo from the error amplifier 22A decreases. Since the output voltage Veo of the error amplifier 22A increases or decreases by means of the summer 22B, which outputs the voltage difference (Vref1−Veo) between the first reference voltage Vref1 and the output voltage Veo, the output voltage V2 of the error amplifying section 22 increases.

The increased output voltage V2 of the error amplifying section 22 is multiplied by the current detection voltage V1 of the current sensing section 21 or 21A by means of the multiplier 23, and the feedforward control loop increases the slope of the sensed current, causing the duty cycle (switching-on time) to decrease. As a result, the output voltage Vo of the boost converter 10 decreases.

The relationship with respect to the duty cycle is given by:

Vo=(switching-on time+switching-off time)/switching-off time*Vin (relationship expression of the boost converter)

The current detection voltage V1 of the current sensing section 21 or 21A includes a component attributed to current variation (di). This current variation amount is multiplied by the multiplier 23 which has a gain K, and the multiplied current variation is compared with the inverse sawtooth wave B to control the duty cycle.

In FIG. 4, V2' and V3' are waveforms showing the condition in which the output voltage Vo of the boost converter 10 has increased. As the output voltage of the error amplifying section 22 increases from V2 to V2', the input current flowing through the inductor L is controlled to decrease from iL to iL', resulting in the normal operation of the feedback control loop.

As described above, according to the present invention, an error voltage which is fed back is multiplied by a sensed voltage corresponding to an input current which is fed forward, to generate a reference voltage. Therefore, a feedforward control loop with respect to an input voltage can be eliminated so that a circuit having a simple structure can be achieved.

Having described and illustrated the principles of the invention in a preferred embodiment thereof, it should be apparent that the invention can be modified in arrangement and detail without departing from such principles. I claim all modifications and variations coming within the spirit and scope of the following claims.

We claim:

1. A power factor correction circuit for a switching power converter having an inductor and a switch for controlling the inductor, the circuit comprising:

a signal generator for generating a sawtooth signal;

a current sensing circuit coupled to the converter to generate a current signal responsive to current flowing through the inductor;

a comparing circuit coupled to the signal generator, the current sensing circuit, and the switch;

an error amplifying circuit coupled to the converter for generating an error signal responsive to the output voltage of the converter; and a multiplier circuit coupled to the current sensing circuit, the error amplifying circuit, and the comparing circuit for multiplying the current signal and the error signal;

wherein the comparing circuit compares the sawtooth signal to the current signal, thereby generating a control signal for controlling the switch; and wherein the current sensing circuit is coupled in series with the switch and arranged to sense the current through the inductor when the switch is open and closed.

2. A circuit according to claim 1 wherein the sawtooth signal has a fixed frequency.

3. A circuit according to claim 1 wherein the current sensing circuit is coupled in series with the switch and arranged to sense the current through the inductor only when the switch is closed.

4. A circuit according to claim 1 wherein the signal generator further generates a cyclical clock signal for controlling the switch, each cycle of the clock signal corresponding to a cycle of the sawtooth signal.

5. A circuit according to claim 4 further including a switch drive circuit coupled to the comparing circuit to receive the control signal, coupled to the signal generator to receive the clock signal, and coupled to the switch, wherein the switch drive circuit turns the switch on responsive to the clock signal and turns the switch off responsive to the control signal.

6. A method for controlling a switching power converter having an inductor and a switch for controlling the inductor in switching cycles, the method comprising:

turning the switch on during each switching cycle;

sensing current flowing through the inductor;

comparing the current flowing through the inductor to a sawtooth signal;

turning the switch off during each switching cycle responsive to the level the sensed current;

sensing the output voltage of the converter; and multiplying the current flowing through the inductor by the output voltage of the converter.

7. A method according to claim 6 wherein sensing current flowing through the inductor includes sensing current flowing through the inductor only when the switch is closed.

8. A method according to claim 6 wherein sensing current flowing through the inductor includes sensing current flowing through the inductor when the switch is open and closed.

9. A method according to claim 6 wherein the sawtooth signal operates at a fixed frequency.

10. A power factor correction circuit for a power converter having an inductor and a switch for controlling the inductor in switching cycles, the circuit comprising:

a signal generator for generating a cyclical sloping signal;

a current sensing circuit coupled to the converter for generating a current signal responsive to current flowing through the inductor;

a comparing circuit coupled to the signal generator, the current sensing circuit, and the switch, wherein the comparing circuit compares the cyclical sloping to the current signal, thereby generating a control signal for controlling the switch;

an error amplifying circuit coupled to the converter for generating an error signal responsive to the output voltage of the converter; and a multiplier circuit coupled to the current sensing circuit, the error amplifying circuit, and the comparing circuit for multiplying the current signal and the error signal;

wherein each cycle of the sloping signal corresponds to a switching cycle.

11. A circuit according to claim 10 wherein the current sensing circuit is coupled in series with the switch and arranged to sense the current through the inductor when the switch is open and closed.

12. A circuit according to claim 10 wherein the signal generator further generates a cyclical clock signal for controlling the switch, each cycle of the clock signal corresponding to a cycle of the sloping signal.

13. A circuit according to claim 12 further including a switch drive circuit coupled to the comparing circuit to receive the control signal, coupled to the signal generator to receive the clock signal, and coupled to the switch, wherein the switch drive circuit turns the switch on responsive to the clock signal and turns the switch off responsive to the control signal.

14. A circuit according to claim 10 wherein the cyclical sloping signal is a sawtooth signal.

15. A circuit according to claim 10 wherein the cyclical sloping signal has a fixed frequency.

16. A circuit according to claim 10 wherein the current sensing circuit is coupled in series with the switch and arranged to sense the current through the inductor only when the switch is closed.

* * * * *

UNITED STATES PATENT AND TRADEMARK OFFICE
CERTIFICATE OF CORRECTION

PATENT NO.    : 5,949,229                                                Page 1 of 1
DATED         : September 7, 1999
INVENTOR(S)   : Nak-Choon Choi et al.

It is certified that error appears in the above-identified patent and that said Letters Patent is hereby corrected as shown below:

<u>Column 4,</u>
Line 8, "output/Q" should read -- output /Q --;

<u>Column 5,</u>
Line 54, "Vin di/dt" should read -- Vin $\propto$ di/dt --;
Line 62, "di(off)/dt(off) (Vo-Vin)/L" should read -- di(off)/dt(off) $\propto$ (Vo - Vin) / L --;

<u>Column 8,</u>
Line 11, "a power converter" should read -- a switching power converter --.

Signed and Sealed this

Twenty-fifth Day of February, 2003

JAMES E. ROGAN
*Director of the United States Patent and Trademark Office*